(12) United States Patent
Bremmer et al.

(10) Patent No.: US 10,100,786 B2
(45) Date of Patent: Oct. 16, 2018

(54) TWO-STAGE ENGINE CHARGE AIR SYSTEM WITH BRANCH CONDUITS

(71) Applicant: Cummins Inc., Columbus, IN (US)

(72) Inventors: Robin J. Bremmer, Columbus, IN (US); Philipe F. Saad, Columbus, IN (US)

(73) Assignee: CUMMINS INC., Columbus, IN (US)

( * ) Notice: Subject to any disclaimer, the term of this patent is extended or adjusted under 35 U.S.C. 154(b) by 203 days.

(21) Appl. No.: 15/176,794

(22) Filed: Jun. 8, 2016

(65) Prior Publication Data

US 2017/0356398 A1    Dec. 14, 2017

(51) Int. Cl.
*F02M 26/22* (2016.01)
*F02B 75/22* (2006.01)
*F02B 5/02* (2006.01)

(52) U.S. Cl.
CPC ........... *F02M 26/22* (2016.02); *F02B 5/02* (2013.01); *F02B 75/22* (2013.01)

(58) Field of Classification Search
CPC .......... F02B 5/02; F02B 75/22; F02M 26/22
See application file for complete search history.

(56) References Cited

U.S. PATENT DOCUMENTS

| | | | | |
|---|---|---|---|---|
| 5,440,881 A | * | 8/1995 | Sudmanns | F02B 75/22 60/612 |
| 5,577,900 A | * | 11/1996 | Ramsden | F02B 37/007 60/612 |
| 6,564,783 B2 | * | 5/2003 | Chou | F02B 29/0412 123/559.1 |
| 7,028,679 B2 | | 4/2006 | Hillman et al. | |
| 7,703,284 B2 | | 4/2010 | Becker et al. | |
| 8,113,182 B2 | * | 2/2012 | Wegner | F02B 29/0412 60/602 |
| 2007/0062679 A1 | * | 3/2007 | Agee | F28F 9/02 165/158 |
| 2012/0255299 A1 | | 10/2012 | Gunkel et al. | |
| 2012/0325185 A1 | * | 12/2012 | Baumann | F02M 26/19 123/568.15 |
| 2013/0263833 A1 | * | 10/2013 | Rothmund | F02B 75/22 123/568.12 |
| 2017/0356399 A1 | * | 12/2017 | Ntone | F02B 75/22 |

FOREIGN PATENT DOCUMENTS

| | | | | |
|---|---|---|---|---|
| JP | 2008025564 A | * | 2/2008 | ............ F02B 33/44 |
| JP | 2015117632 A | * | 6/2015 | ............ F02B 75/22 |

* cited by examiner

*Primary Examiner* — Mary A Davis
(74) *Attorney, Agent, or Firm* — Faegre Baker Daniels LLP

(57) ABSTRACT

A system is provided comprising an engine having a first cylinder bank and a second cylinder bank disposed in a VEE configuration, a first compressor configured to compress fluid to a first pressure, a first cooler coupled to the first compressor, the first cooler receiving the compressed fluid from the first compressor and cooling the compressed fluid, a second compressor coupled to the first cooler, the second compressor being configured to receive cooled, compressed fluid from the first cooler and compress the cooled, compressed fluid to a second pressure that is higher than the first pressure, and a second cooler coupled to the second compressor, the second cooler receiving the compressed fluid from the second compressor and cooling the compressed fluid for introduction into the pair of cylinder banks. The first compressor, the first cooler, the second compressor and the second cooler are disposed within the VEE.

18 Claims, 17 Drawing Sheets

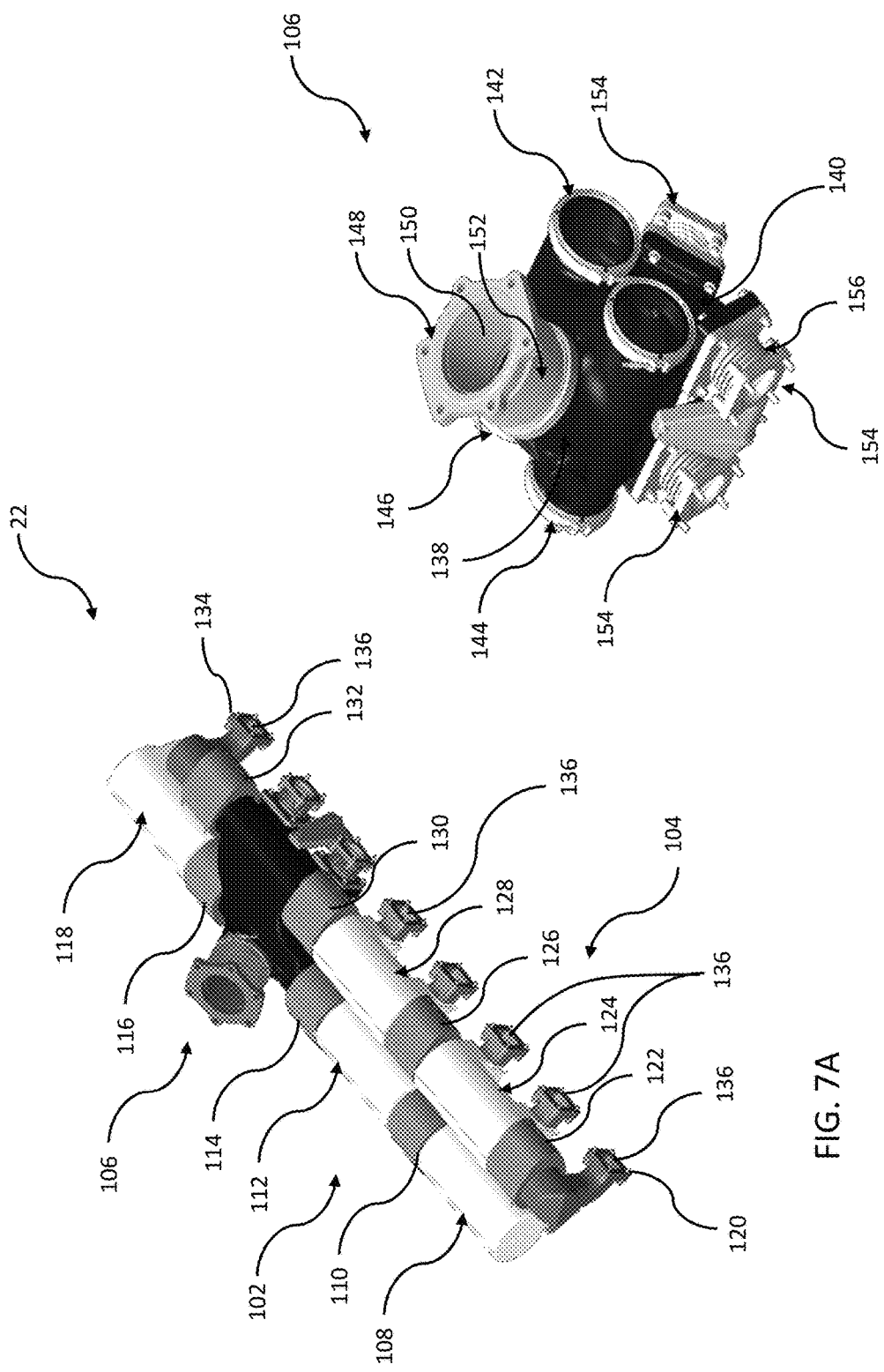

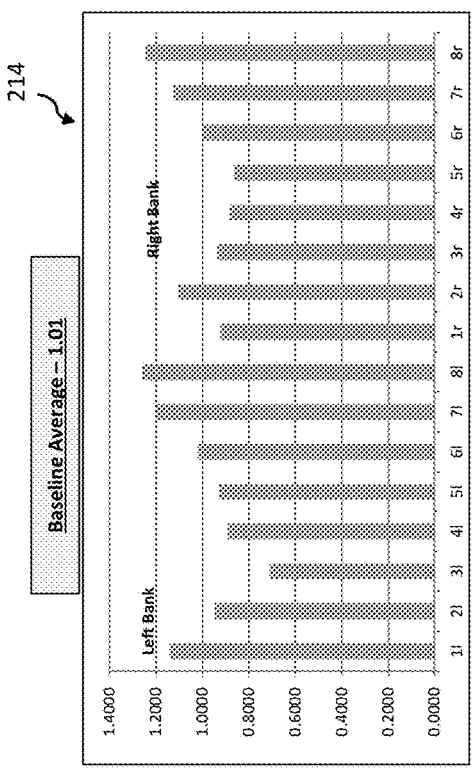
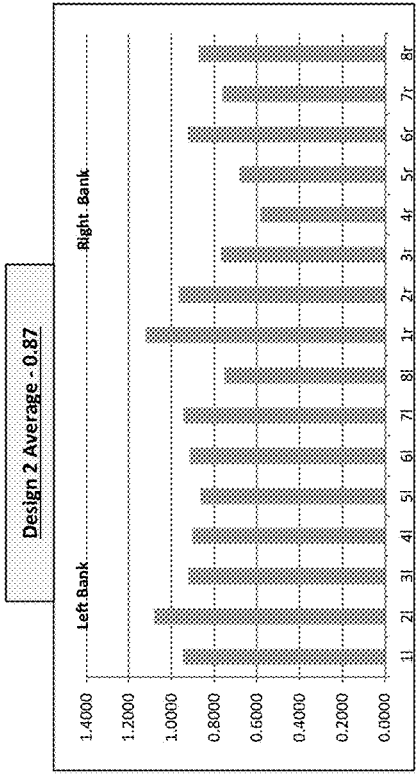
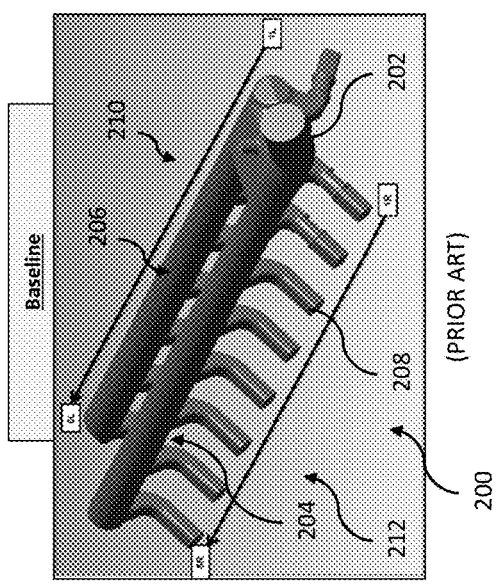
FIG. 8A
(PRIOR ART)
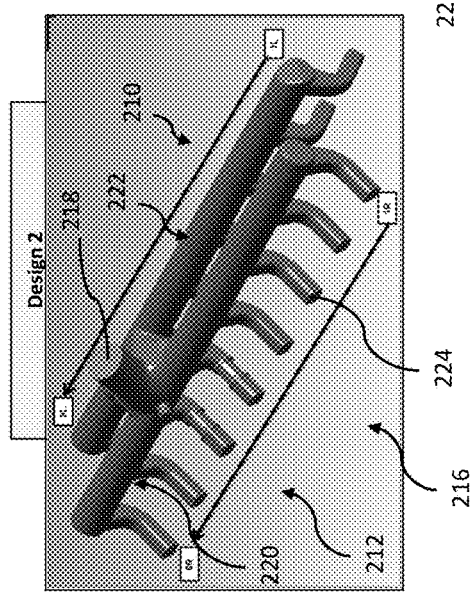
FIG. 8B

TWO-STAGE ENGINE CHARGE AIR SYSTEM WITH BRANCH CONDUITS

TECHNICAL FIELD

The present invention relates generally to charge air systems, and more specifically to an exhaust manifold for a two-stage engine charge air system packaged within the VEE on a spark-ignited engine.

BACKGROUND

Typically vehicle engines and engines used in other applications are housed within an engine compartment or other type of enclosure. It is generally a challenge to package the engine and all of the various on-engine components (e.g., turbochargers, aftercoolers, etc.) within the relatively tight spaces provided.

In many applications, some engine components are mounted adjacent the side of the engine. The more engine accessories or components mounted along the sides of the engine, however, the more difficult it is to access the engine for activities such as maintenance.

In VEE-configuration engines, it may be desirable to mount certain engine components "within the VEE," along the top of the engine. Some engine designs include a turbocharger and aftercooler mounted within the VEE. However, space is limited within the VEE, and the challenges of incorporating additional components within the VEE, such as an additional turbocharger and aftercooler in two-stage engine applications, have not been overcome by conventional approaches.

Accordingly, it is desirable to provide a two-stage engine charge air system mounted within the VEE of a spark-ignited engine.

SUMMARY

According to one embodiment, a system is provided, comprising an engine having a first cylinder bank and a second cylinder bank disposed in a VEE configuration, each cylinder bank having a centerline that lies in a plane that passes through a crankshaft centerline, the planes defining a VEE above the crankshaft centerline, a first compressor configured to compress a fluid to a first pressure, a first cooler coupled to the first compressor, the first cooler receiving the compressed fluid from the first compressor and cooling the compressed fluid, a second compressor coupled to the first cooler, the second compressor being configured to receive cooled, compressed fluid from the first cooler and compress the cooled, compressed fluid to a second pressure that is higher than the first pressure, and a second cooler coupled to the second compressor, the second cooler receiving the compressed fluid from the second compressor and cooling the compressed fluid for introduction into the pair of cylinder banks, wherein the first compressor, the first cooler, the second compressor and the second cooler are disposed within the VEE. In one aspect of this embodiment, the first compressor is comprised in a low pressure turbocharger and the second compressor is comprised in a high pressure turbocharger. In a variant of this aspect, the low pressure turbocharger is at least partially disposed beyond one end of the engine. Another aspect further comprises a first and second throttle, wherein the first throttle is upstream of the first cylinder bank and in fluid communication with the first cylinder bank via a first flow path, and the second throttle is upstream of the second cylinder bank and in fluid communication with the second cylinder bank via a second flow path. In a variant of this aspect, the first flow path and the second flow path are formed within a thermal housing coupled to the first and second throttle, the first flow path being separate from the second flow path. In another variant, the first and second throttles are coupled to the second cooler. In still another variant, the first throttle and the second throttle are independently controlled to provide a desired amount of fluid to the first cylinder bank and the second cylinder bank.

In another embodiment, a two-stage turbo system is provided for a spark-ignited engine having a first cylinder bank and a second cylinder bank disposed in a VEE configuration, a first plane passing through the first cylinder bank and a crankshaft centerline and a plane passing through the second cylinder bank and the crankshaft centerline defining a VEE above the crankshaft centerline, the system comprising a low pressure turbocharger comprising a first compressor configured to compress fluid to a first pressure, a high pressure turbocharger comprising a second compressor coupled to the first compressor and configured to compress fluid to a second pressure that is higher than the first pressure, wherein the low pressure turbocharger and the high pressure turbocharger are disposed within the VEE. One aspect of this embodiment comprises a first cooler coupled between the first compressor and the second compressor, the first cooler receiving the compressed fluid from the first compressor and cooling the compressed fluid. A variant of this aspect further comprises a second cooler coupled to the second compressor, the second cooler receiving the compressed fluid from the second compressor and cooling the compressed fluid for introduction into the pair of cylinder banks. In another aspect, the low pressure turbocharger is at least partially disposed beyond one end of the engine. Yet another aspect further comprises a first and second throttle configured to receive cooled fluid from the second cooler, wherein the first throttle is upstream of the first cylinder bank and in fluid communication with the first cylinder bank via a first flow path, and the second throttle is upstream of the second cylinder bank and in fluid communication with the second cylinder bank via a second flow path. In a variant of this aspect, the first throttle and the second throttle are independently controlled to provide a desired amount of fluid to the first cylinder bank and the second cylinder bank.

In yet another embodiment, a vehicle is provided, comprising an engine comprising a first end, a second end, a crankshaft, a first cylinder bank and a second cylinder bank, wherein a first plane passing through the first cylinder bank and a centerline of a crankshaft and a second plane passing through the second cylinder bank and the centerline of the crankshaft define a VEE above the centerline of the crankshaft, a first turbocharger configured to receive intake fluid and compress the intake fluid to a first pressure, the first turbocharger being disposed within the VEE adjacent the first end of the engine, and a second turbocharger coupled to the first turbocharger and configured to further compress the fluid from the first turbocharger to a second pressure that is higher than the first pressure, the second turbocharger being disposed within the VEE between the first end and the second end of the engine. One aspect of this embodiment further comprises an exhaust manifold having a collector disposed within the VEE adjacent the second turbocharger, the collector being configured to deliver exhaust gas from the first and second cylinder banks to a turbine of the second turbocharger. Another aspect further comprises a first cooler coupled between the first turbocharger and the second turbocharger, the first cooler receiving the compressed intake fluid from the first turbocharger and cooling the compressed fluid. In a variant of this aspect, the first cooler comprises an inlet diffuser configured to distribute fluid across an inlet of the first cooler. Another aspect further comprises a second cooler coupled to the second turbocharger, the second cooler receiving the compressed fluid from the second turbocharger and cooling the compressed fluid for introduction into the first and second cylinder banks. In a variant of this aspect, the second cooler comprises an inlet diffuser having a plurality of fins that distribute fluid across an inlet of the second cooler. In another aspect, the first turbocharger is at least partially disposed beyond the first end of the engine.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein:

FIG. 7A is a perspective view of an exhaust manifold according to one embodiment of the present disclosure;

FIG. 7B is a perspective view of a cross-over collector of the exhaust manifold of FIG. 7A;

FIG. 8A depicts a prior art exhaust manifold and an associated graph of exhaust loss coefficients;

FIG. 8B depicts an exhaust manifold according to the principles of the present disclosure and an associated graph of exhaust loss coefficients;

Figure 1:
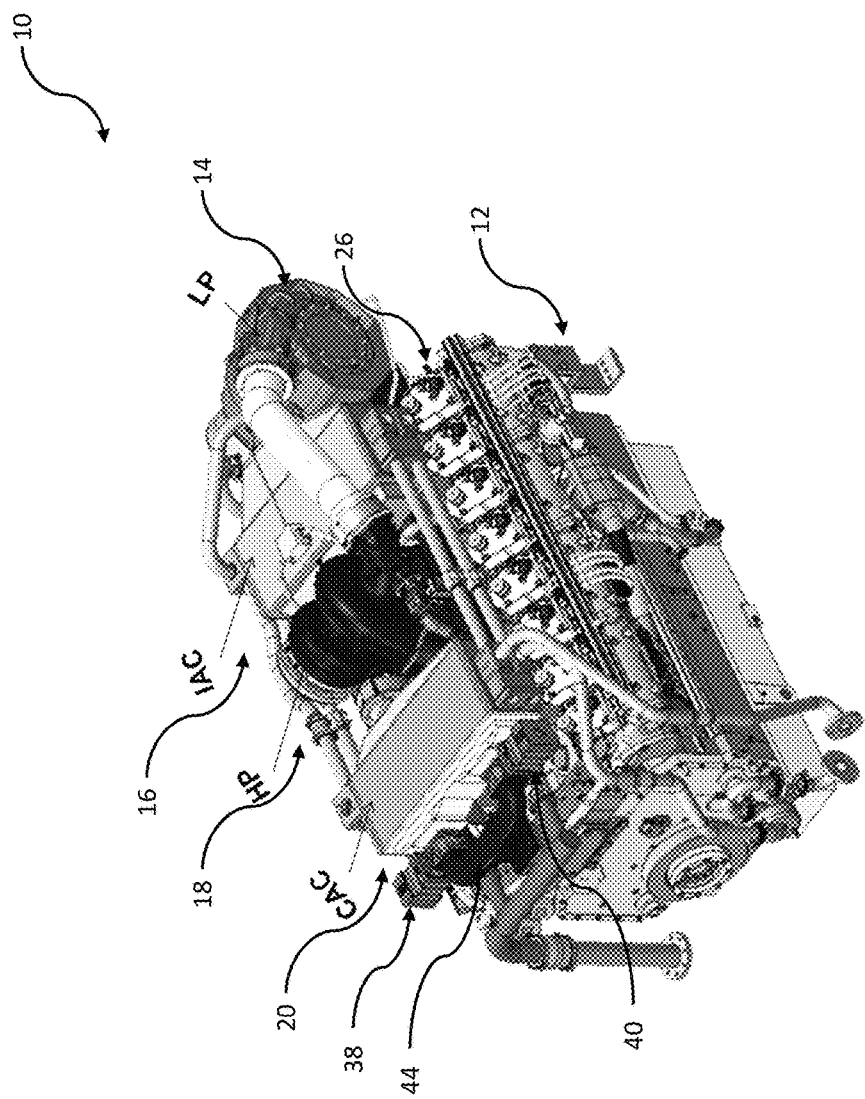
FIG. 1 is a perspective view of a two-stage turbo system according to the principles of the present disclosure.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIGS. 1-4 depict a two-stage turbo system according to the principles of the present disclosure. In general, system 10 includes a VEE-configuration engine 12, a low pressure turbocharger 14, an inter-stage air cooler 16 (or intercooler 16), a high pressure turbocharger 18, a charge air cooler 20 (or aftercooler 20) and an exhaust manifold 22 (FIGS. 7A-B). As described in more detail below, both turbochargers 14, 18, both coolers 16, 20 and exhaust manifold 22 are located on top of engine 12 within the VEE. Engine 12 may have any number of cylinders and may be a compression engine or a spark-ignited engine. Certain applications of the present disclosure include engines having 140 mm or larger bore sizes.

Figure 2:
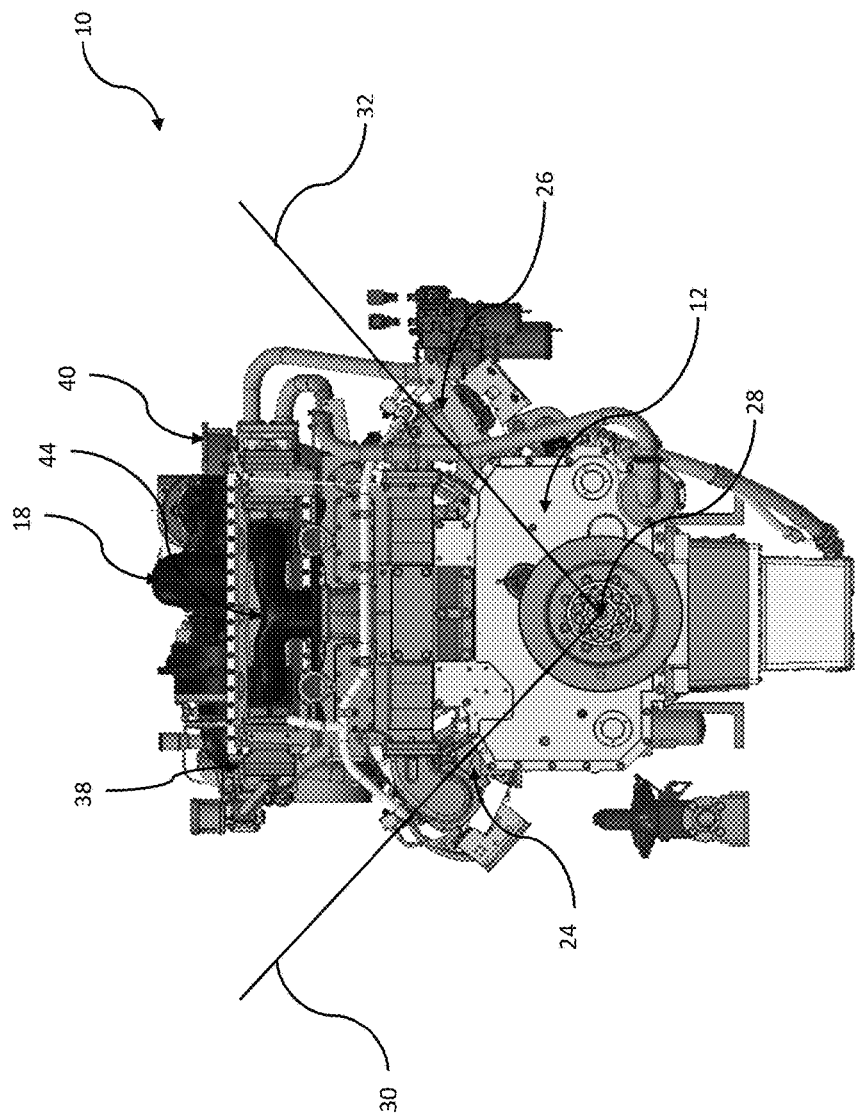
FIG. 2 is an end view of the system of FIG. 1.

FIG. 2 more clearly shows the VEE mounting location of the components mentioned above. As shown, engine 12 includes two banks 24, 26 of cylinders which are mounted at an angle relative to the engine crankshaft centerline 28. Each bank 24, 26 of cylinders has a centerline. A plane 30 passing through crankshaft centerline 28 and the centerline of cylinder bank 24 and a plane 32 passing through crankshaft centerline 28 and the centerline of cylinder bank 26 define side boundaries of the VEE. As shown in FIG. 1, the VEE may extend from the front of engine 12 to the rear of engine 12, and even somewhat beyond the forwardmost and rearwardmost locations of the engine. More specifically, while low pressure turbocharger 14 is oriented beyond the end of engine 12, it is still located within the VEE.

Figure 3:
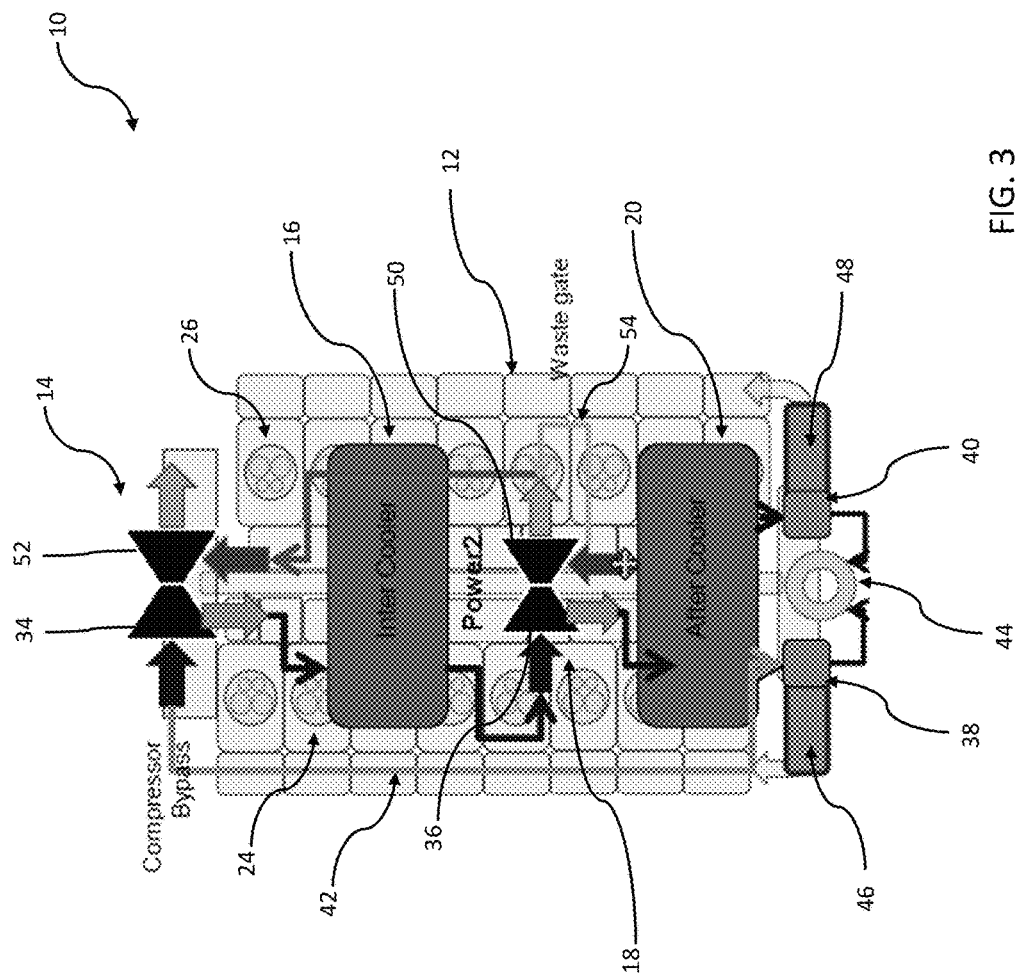
FIG. 3 is a conceptual top view of the system of FIG. 1.

Referring now to FIG. 3, a conceptual top view of system 10 is shown. Air or an air/fuel mixture (depending upon where fuel is introduced into system 10) exits compressor 34 of low pressure turbocharger 14 and is routed to an input of intercooler 16 (described in detail below). While air or an air/fuel mixture is referred to herein, it should be understood that the term fluid as used herein encompasses any gas or liquid. After cooling in intercooler 16 to increase its density, the air is routed to the compressor 36 of high pressure turbocharger 18. Air expelled from compressor 36 is routed to aftercooler 20 (described in detail below), where it is again cooled to increase its density. Air is then routed from aftercooler 20 into throttles 38, 40. It should be understood, however, that under certain engine operating conditions, such as very cold weather start-up conditions, some air from aftercooler 20 is routed back to low pressure turbocharger 14 via compressor bypass line 42. In this manner, compressor bypass line 42 functions as a kind of a wastegate for the compression side of system 10. Under normal operating conditions, compressor bypass line 42 is closed.

Figure 9A:
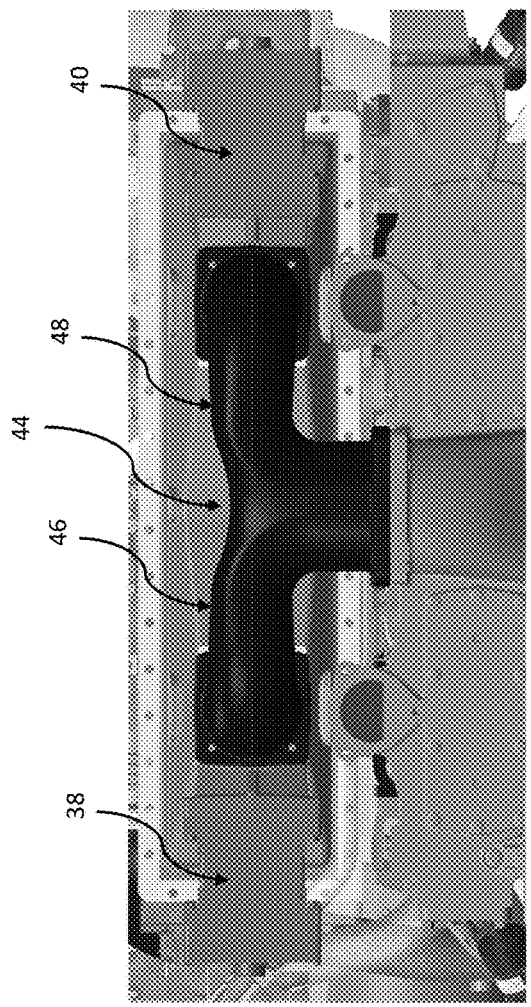
FIG. 9A is a top plan view of components of a charge air distribution system according to the principles of the present disclosure.
Figure 9B:
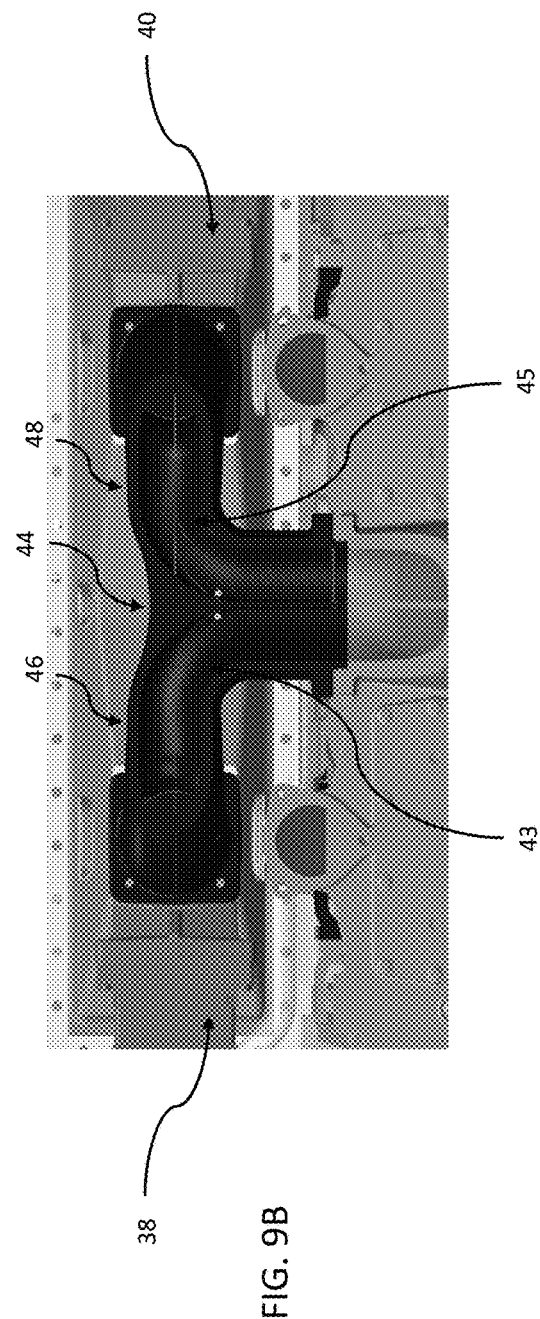
FIG. 9B is a top plan view of the charge air distribution system of FIG. 9A, shown partly in section.

Throttle 38 services cylinder bank 24 and throttle 40 services cylinder bank 26. In one embodiment of the present disclosure, throttles 38, 40 are monitored and controlled by an on-engine electronic control system (not shown) to ensure each throttle is providing even amounts of air or air/fuel mixture to the respective cylinder banks. This is performed by monitoring the intake manifold pressure and temperature and the pressure differential across each throttle for each respective cylinder bank and commanding the appropriate signal to the respective throttle. In addition to this bank-to-bank balancing, provision of two throttles 38, 40 permits control over and compensation for innate bank-to-bank differences in terms of air or air/fuel mixture restriction characteristics. This is performed by monitoring the intake manifold pressure and temperature, the pressure differential across each throttle for each respective cylinder bank, and comparing it to the exhaust manifold pressure in the central logs collector (218). Air from throttles 38, 40 is routed into thermal housing 44, then distributed left and right to cylinder banks 24, 26 by first branch conduit 46 and second branch conduit 48, respectively. It should be understood that the flow of air from throttles 38, 40 remains separate as it is passed through thermal housing 44. As best shown in FIGS. 9A-B, two separate flow paths 43, 45 are provided through thermal housing 44—flow path 43 for air from throttle 38 and flow path 45 for air from throttle 40.

Exhaust from engine 12 is routed from exhaust manifold 22 (described in detail below) into the turbine 50 of high pressure turbocharger 18, and from turbine 50 to turbine 52 of low pressure turbocharger 14. From low pressure turbocharger 14, the exhaust is typically routed to an aftertreatment system (not shown). It should be understood that system 10 further includes an exhaust wastegate 54 which permits a controllable about of exhaust from engine 12 to bypass high pressure turbocharger 18.

Figure 5:
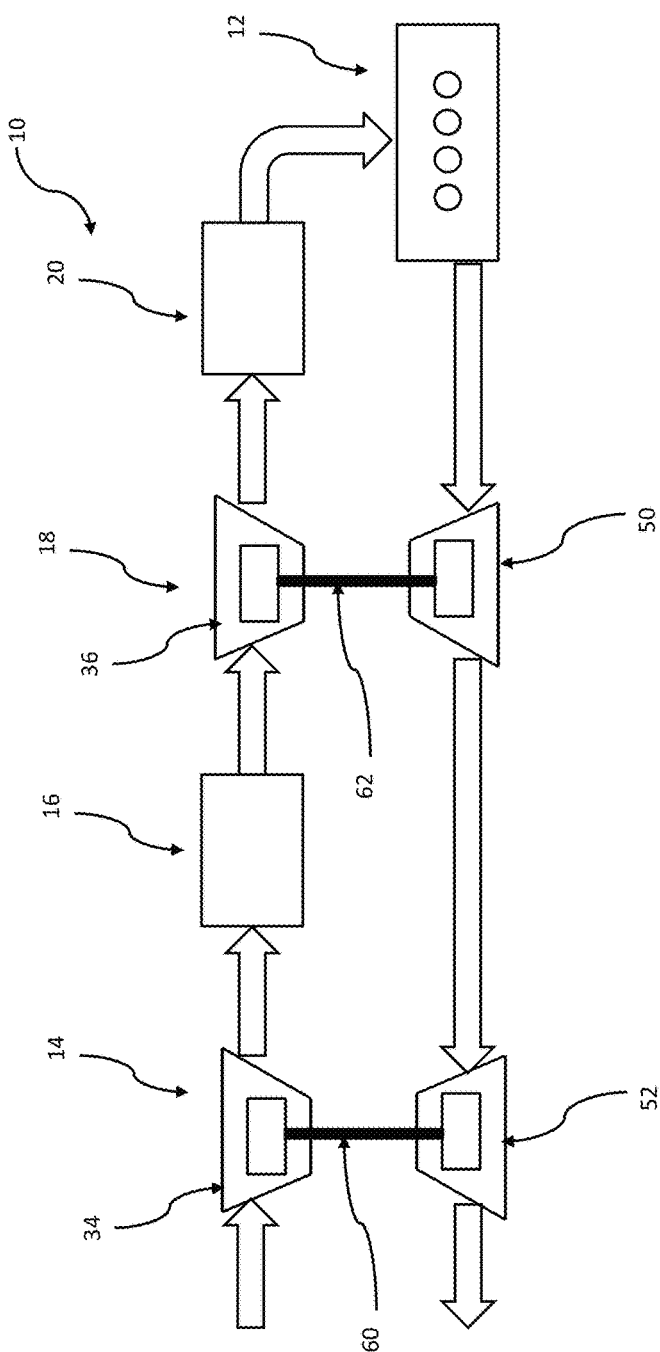
FIG. 5 is a conceptual diagram of a two-stage turbo system according to the principles of the present disclosure.

FIG. 5 is a conceptual diagram of system 10 according to the present disclosure. As shown, system 10 includes engine 12, low pressure turbocharger 14, intercooler 16, high pressure turbocharger 18, and aftercooler 20. Low pressure turbocharger 14 includes a compressor 34 and a turbine 52 connected together by a rod 60 or other mechanical connection. High pressure turbocharger 18 includes a compressor 36 and a turbine 50 connected together by a rod 62 or other mechanical mechanism. Compressor 34 of low pressure turbocharger 14 may receive air or a mixture of air and fuel as is further described below. For simplicity, system 10 will be described as receiving a charge, although it should be understood that the fuel component of the charge may be introduced at various locations upstream of engine 12. As shown, the charge to the engine 12 is provided through the two-stage system via turbocharger 14, intercooler 16, turbocharger 18 and aftercooler 20. The exhaust from engine 12 powers turbines 50, 52 of turbochargers 18, 16 respectively, which each power their respective compressors via rods 62, 60.

Figure 6:
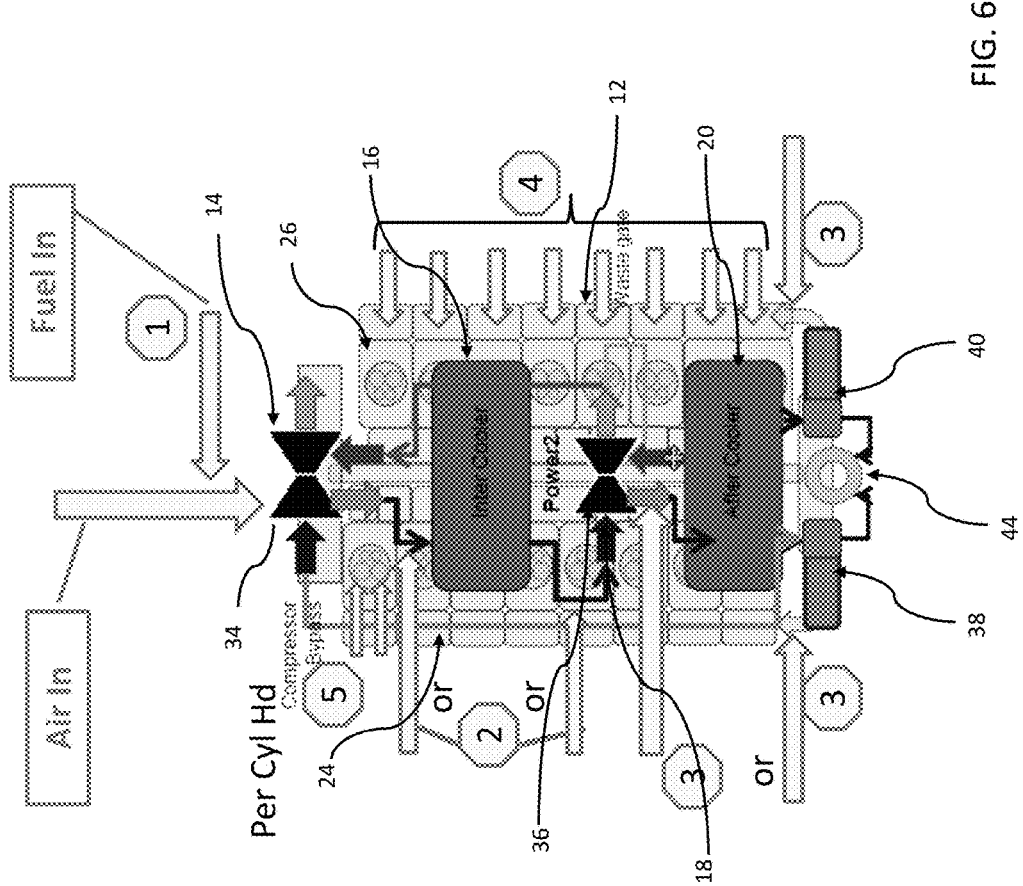
FIG. 6 is a conceptual top view of the system of FIG. 1 depicting different locations for injecting fuel to mix with air.

Referring now to FIG. 6, various locations are shown for the introduction of fuel into the air in system 10. As indicated by number 1, fuel may be introduced into the air flow provided to compressor 34 of low pressure turbocharger 14. Fuel introduced at this location may have a pressure of 1 to 5 psia in certain applications. Fuel may also be introduced at location 2, either upstream of intercooler 16 or just downstream of intercooler 16. Fuel introduced at this location may have a pressure of 5 to 50 psia in certain applications. Alternatively, fuel may be introduced at the location labeled 3, after the compressor 36 of high pressure turbocharger 18 and upstream of aftercooler 20 or after aftercooler 20 and upstream of throttles 38, 40. Fuel introduced at this location may have a pressure of 80 to 85 psia in certain applications. In the alternative, fuel may be introduced at fuel injector ports as indicated by number 4. This introduction is just ahead of the cylinder head intake ports. Fuel introduced at this location may have a pressure of 80 to 85 psia in certain applications. Finally, fuel may be introduced at location 5, at the intake ports of the fuel injectors. Fuel introduced at this location may have a pressure of 90 to 95 psia in certain applications.

To accommodate the within the VEE location of turbochargers 14, 18 and coolers 16, 20, various aspects of the exhaust system, air/fuel mixture distribution, pressure distribution balancing and mechanical connections were modified. Referring to FIG. 7, the manner in which exhaust is gathered adjacent the center of the VEE between cylinder banks 24, 26 is described below. In order to accommodate the two-stage turbo design within the VEE, exhaust manifold 22 is configured for positioning within the VEE and includes central logs 102, 104 and a cross-over connector 106 within the VEE to route exhaust gas from the central logs 102, 104 to high pressure turbocharger 18. The location of the high pressure turbocharger 18 within the VEE is the primary driver of the design of exhaust manifold 22. Further description of the exhaust manifold may be found in co-pending and co-owned patent application Ser. No. 15/176,625, entitled "EXHAUST MANIFOLD FOR A TWO-STAGE ENGINE CHARGE AIR SYSTEM," filed on Jun. 8, 2016, the entire contents of which being expressly incorporated herein by reference.

Log 102 includes inlet segment 108, bellows 110, inlet segment 112, bellows 114, bellows 116 and inlet segment 118. Log 104 includes single port section 120, bellows 122, inlet segment 124, bellows 126, inlet segment 128, bellows 130, bellows 132, and single port section 134. Each inlet segment of logs 102, 104 includes two inlet ports 136 (only shown for log 104) which are routed to the head of engine 12 to collect exhaust from the cylinders. Single port sections 120, 134 each also include an inlet port 136. Bellows 110, 114, 116, 122, 126, 130 and 132 are provided to accommodate thermal expansion of all of the inlet segments, cross-over collector 106 and single port sections 120, 134, all of which include at least one inlet port 136 for receiving high temperature exhaust gases from the cylinders of engine 12.

As best shown in FIG. 7B, cross-over collector 106 includes a housing 138, an intake opening 140 for coupling to bellows 114, an intake opening 142 for coupling to bellows 130, an intake opening 144 for coupling to bellows 116 and an intake opening 146 for coupling to bellows 132. Each of openings 140, 142, 144, 146 are in flow communication with a central cavity (not shown) within collector 106. Also in flow communication with the central cavity is an outlet 148 configured to couple to turbine 50 of high pressure turbocharger 18. Outlet 148 includes a central opening 150 which delivers exhaust to turbocharger 18 and a bellows 152 to provide thermal isolation between collector 106 and turbocharger 18. Collector 106 also includes four inlet ports 154 (three shown) configured to couple to the head of engine 12 to collect exhaust from the cylinders. The inlet ports 154 each include a bellows 156 to accommodate for thermal expansion. The inlet ports 154 are all in flow communication with the central cavity of collector 106.

As shown, inlet ports 136 of log 102 and two of inlet ports 154 of collector 106 are positioned to couple to cylinders of a first bank of cylinders (such as bank 26) and inlet ports 136 of log 104 and two of inlet ports 154 of collector 106 are positioned to couple to cylinders of a second bank of cylinders (such as bank 24). The first bank of cylinders includes a first cylinder, a last cylinder and a plurality of cylinders in line between the first cylinder and the last cylinder, two of which are coupled to the inlet ports 154 of collector 106. Similarly, the second bank of cylinders includes a first cylinder, a last cylinder and a plurality of cylinders in line between the first cylinder and the last cylinder, two of which are coupled to the inlet ports 154 of collector 106.

It should be understood that in certain conventional approaches, high pressure turbocharger 18 is located forward or rearward of engine 12 (i.e., such as the location of low pressure turbocharger 14 of the present disclosure) where structure exists to support turbocharger 18. In such approaches, exhaust is collected at the end of logs 102, 104 for delivery to high pressure turbocharger 18. If a two-stage turbocharger configuration is implemented in such conventional systems, the low pressure turbocharger 14 may be placed on top of engine 12, which adds several hundred pounds of mass to the top of engine 12.

By configuring collector 106 for placement intermediate the ends of engine 12, it is possible to locate the lower weight high pressure turbocharger 18 on top of engine 12. Moreover, exhaust flow losses may be reduced (resulting in better fuel economy) because each flow path traverses a smaller distance. A more tortured path such as in conventional systems requires more pressure, which leads to greater flow losses. An example of this is depicted in FIG. 8A. A prior art baseline exhaust manifold 200 is shown having a collector 202 at the end of logs 204, 206. Inlet ports 208 for each cylinder of the left bank 210 and the right bank 212 are labeled from right to left 1L through 8L and 1R through 8R, respectively. The corresponding exhaust loss coefficient for each inlet port 208 is shown in chart 214. As shown, the inlet ports 208 having the greatest loss coefficient are 8L and 8R, which are located farthest from collector 202.

A redesigned exhaust manifold 216 (like that of the present disclosure) is shown in FIG. 8B having a collector 218 intermediate the ends of logs 220, 222. The inlet ports 224 have the same labels as inlet ports 208. As shown in chart 226, which depicts the exhaust loss coefficient for each inlet port 224 of manifold 216, the less tortured paths of exhaust from inlet ports 224 through logs 220, 222 to collector 218 (relative to the paths from inlet ports 208 to collector 106) results in lower loss coefficients for several cylinders, and a lower overall loss coefficient of 0.87 (as compared to 1.01 for manifold 200).

Figure 4:
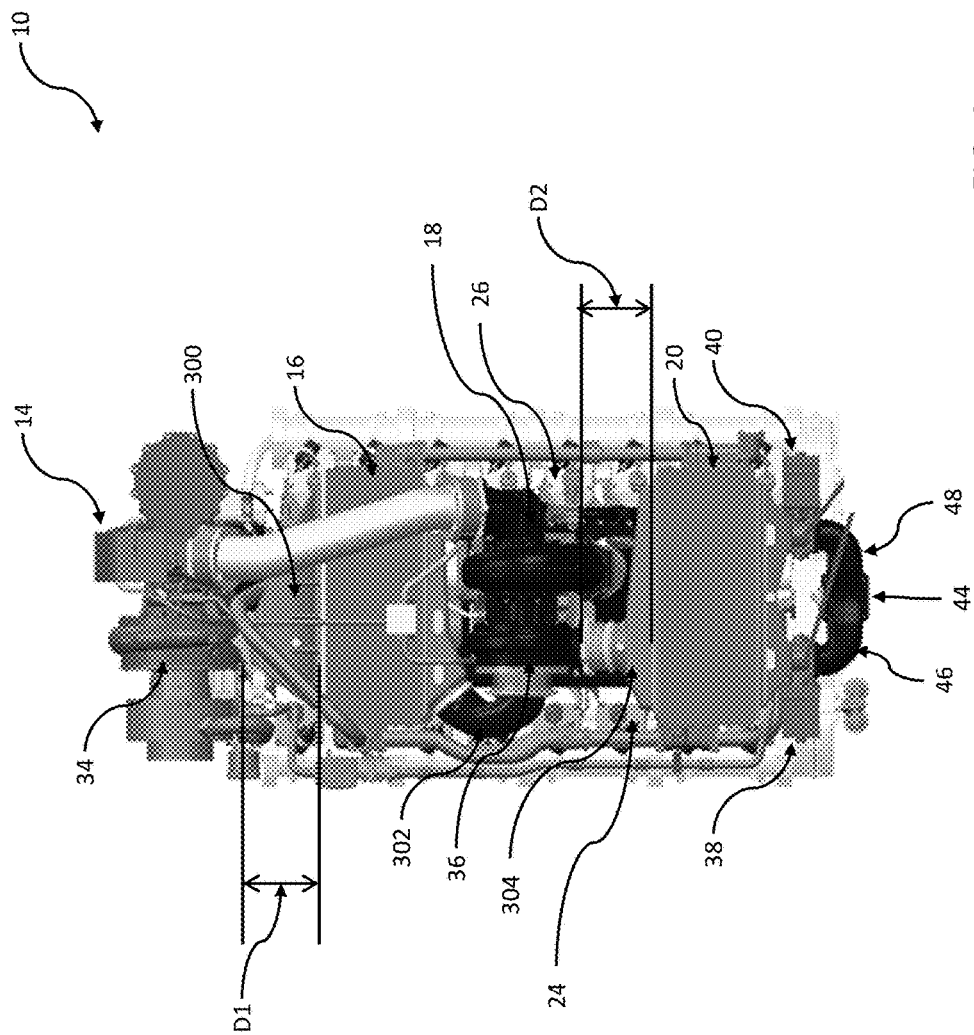
FIG. 4 is a top plan view of the system of FIG. 1.
Figure 10:
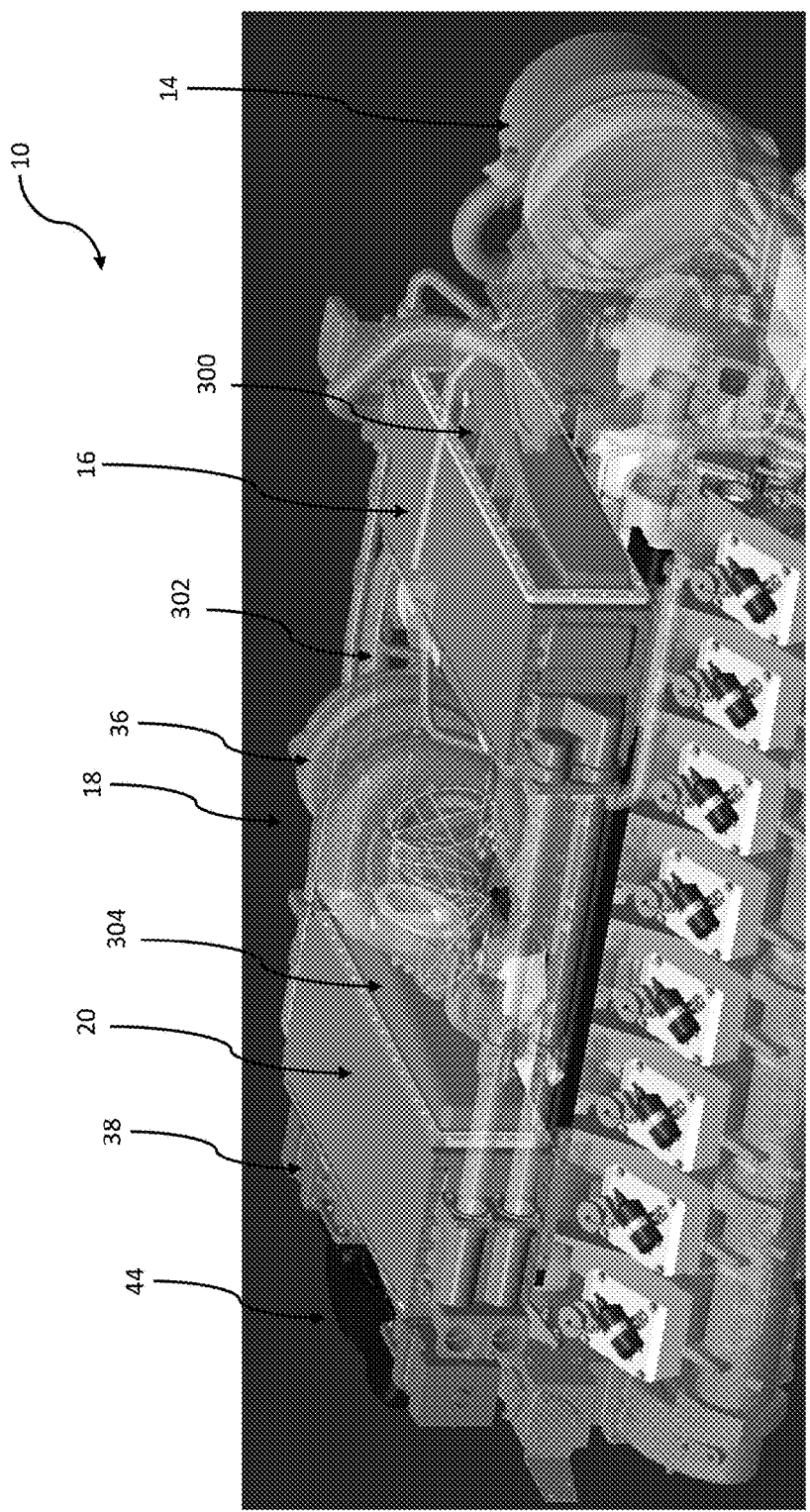
FIG. 10 is a perspective view of the system of FIG. 1.

Referring to FIG. 4 and FIG. 10, compressor 34 of low pressure turbocharger 14 compresses intake air (and in some embodiments fuel) for delivery to aftercooler 16. As shown in FIG. 4, the distance D1 between compressor 34 and aftercooler 16 is small. Consequently, there is very little opportunity to distribute the heated air across the inlet of intercooler 16. To accommodate this air distribution, an inlet diffuser 300 is provided as is further described below. The lower temperature air from intercooler 16 is delivered through tube 302 to compressor 36 of high pressure turbocharger 18, which even further increases the pressure of the air. The resulting high pressure (and reheated) air is then delivered to aftercooler 20, and routed through throttles 38, 40 to engine 12 in the manner described above. As shown, the distance D2 between compressor 36 and aftercooler 20 is also small, leaving little opportunity for distribution of the heated air laterally across the inlet of aftercooler 20. To provide for this air distribution, an inlet diffuser 304 is provided as is further described below. It should be understood from the foregoing that depending upon the location of fuel introduction into the compressed air flow (see FIG. 6), either or both of inlet diffusers 300, 304 may also perform a fuel mixing function.

Figure 11:
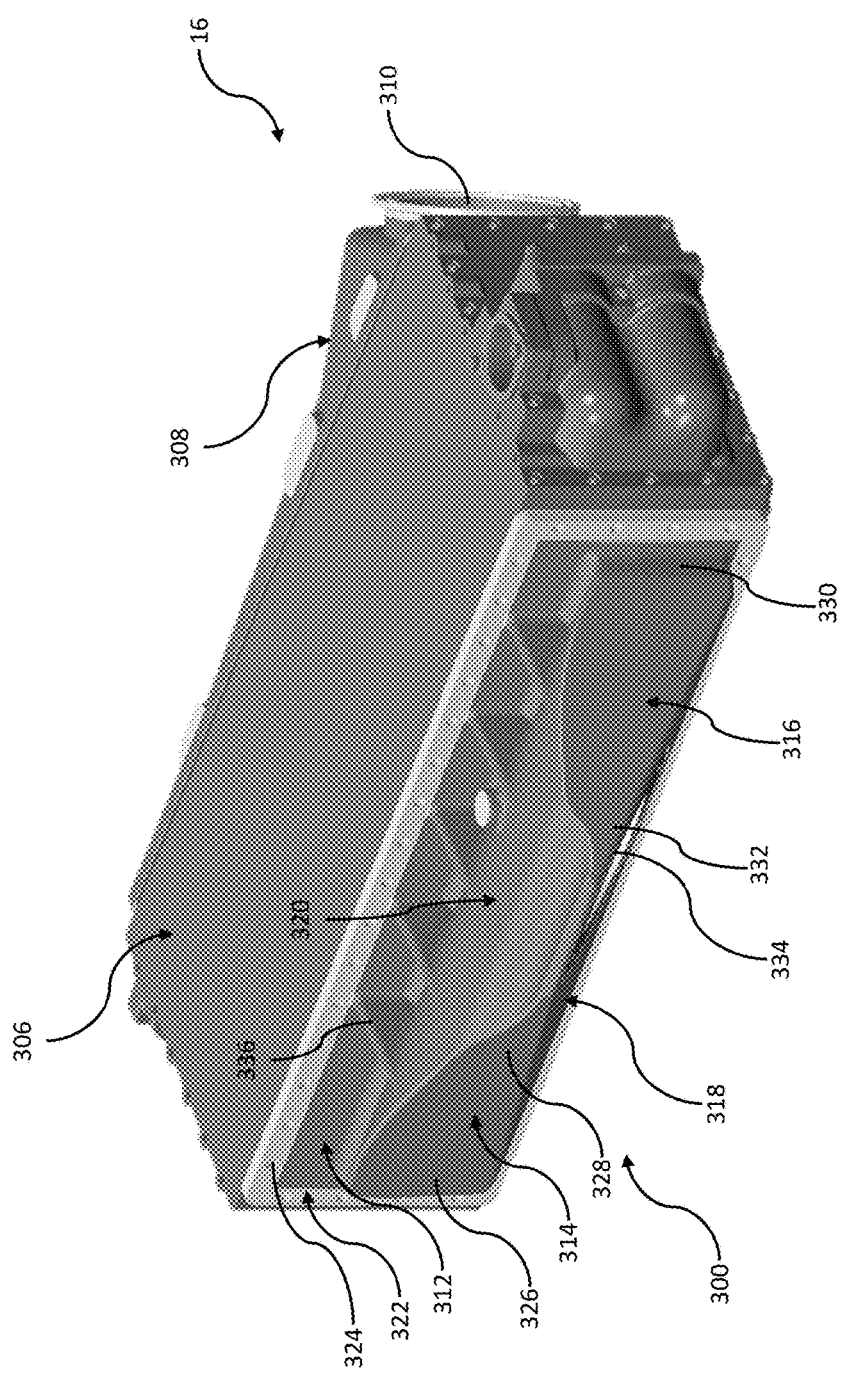
FIG. 11 is a perspective view of an intercooler of the system of FIG. 1.

Referring now to FIG. 11, intercooler 16 is shown with inlet diffuser 300. As shown, in addition to inlet diffuser 300, intercooler 16 includes a housing 306 and an outlet diverter 308. Housing 306 is substantially wider than it is tall. Outlet diverter 308 includes an outlet port 310 which is coupled to tube 302 (FIG. 10) to route cooled air to compressor 36 of high pressure turbocharger 18.

Figure 12A:
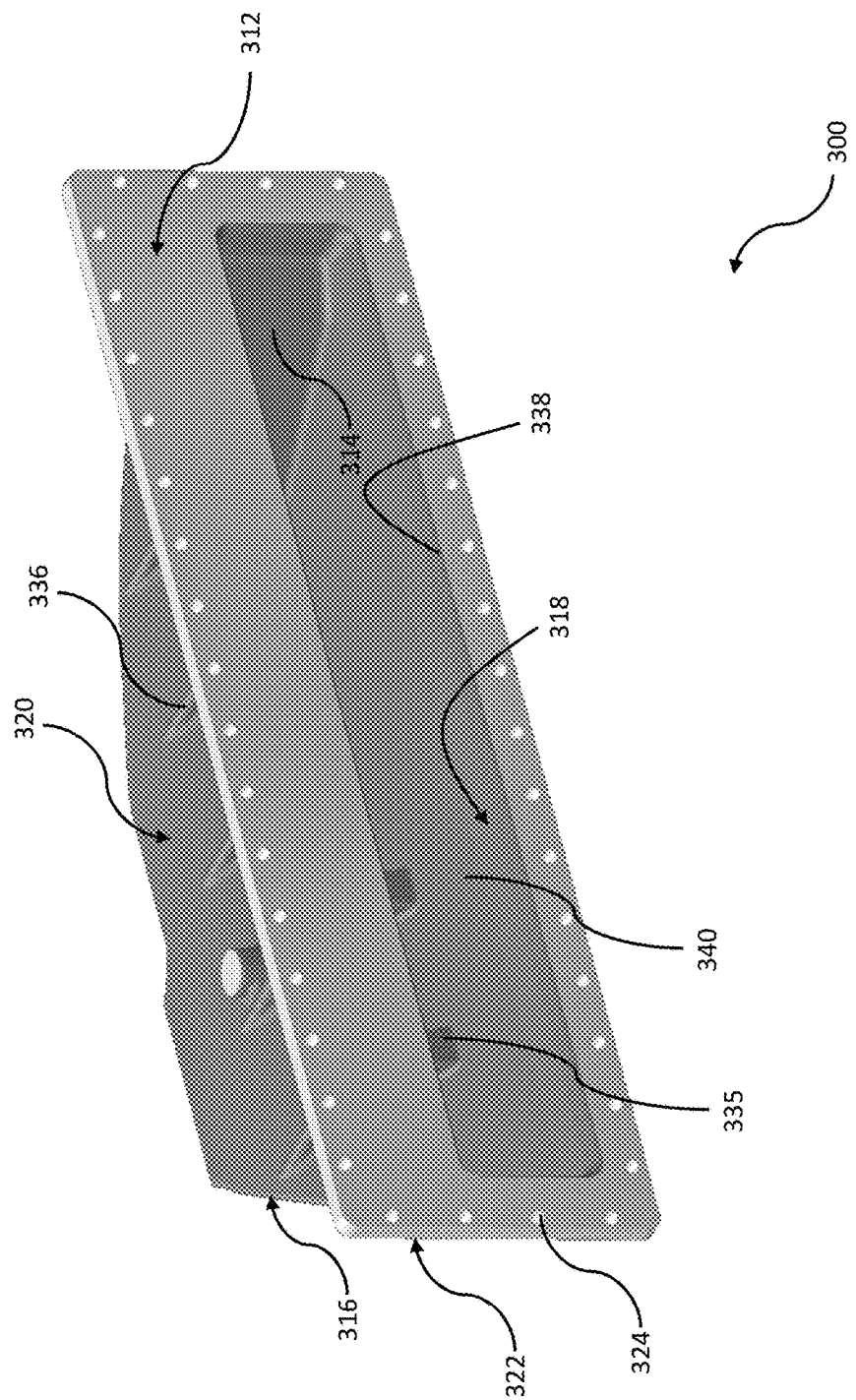
FIG. 12A is a perspective view of an inlet diffuser of the intercooler of FIG. 11.
Figure 12B:
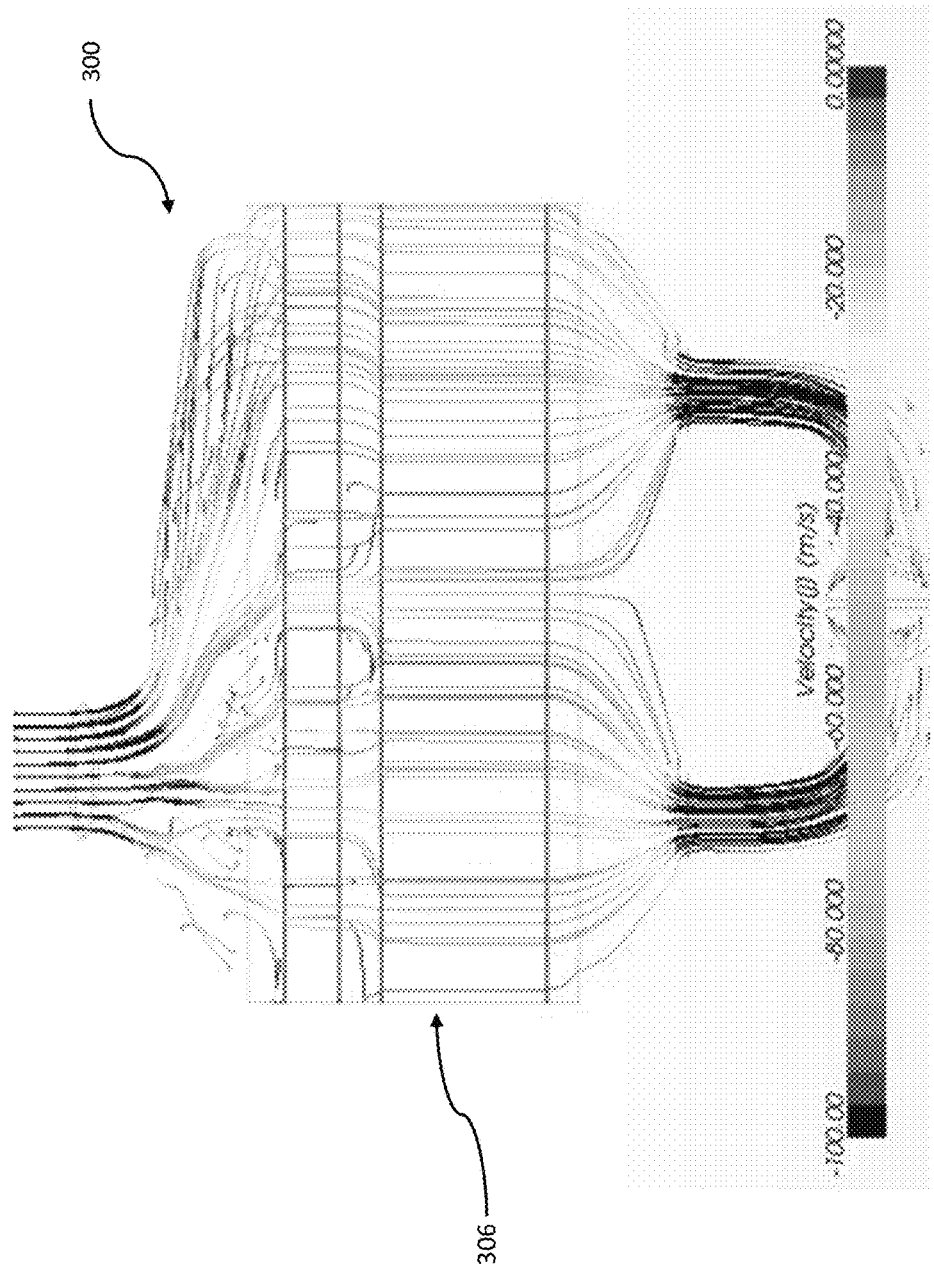
FIG. 12B is a top view of air flow through an inlet diffuser of the intercooler of FIG. 11.

Referring now to FIGS. 11 and 12A-12B, inlet diffuser 300 generally includes a forward wall 312, a pair of side walls 314, 316, a lower wall 318 and an upper wall 320. Forward wall 312 includes a peripheral rim 322 with a plurality of through holes 324 for receiving fasteners (not shown) to secure diffuser 300 to housing 306 of intercooler 16. Side wall 314, which is connected to lower wall 318 and upper wall 320, tapers in width from an end 326 adjacent rim 322 to an end 328 adjacent a central area of diffuser 300. Similarly, side wall 316 is connected between lower wall 318 and upper wall 320 and tapers in width from an end 330 adjacent rim 322 to an end 332 adjacent a central area of diffuser 300. Lower wall 318 extends from rim 322 to the central area of diffuser 300 and is connected to side walls 314, 316. Lower wall 318 includes an opening 334 which is configured to couple to an outlet of compressor 34 of low pressure turbocharger 14. Lower wall 318 further includes at least one protrusion 335 which assists in distribution of flow through diffuser 300. Upper wall 320 extends from forward wall 312 to side walls 314, 316 and lower wall 318. A plurality of ribs 336 extend between upper wall 320 and forward wall 312 to increase the rigidity of diffuser 300. As best shown in FIG. 12A, forward wall 312 forms an opening 338 which delivers air to housing 306, and forward wall 312, side walls 314, 316, lower wall 318 and upper wall 320 define an interior volume 340 of diffuser 300 across which air is distributed for delivery to housing 306. The upper portion of FIG. 12B depicts the flow of air through diffuser 300.

Figure 13:
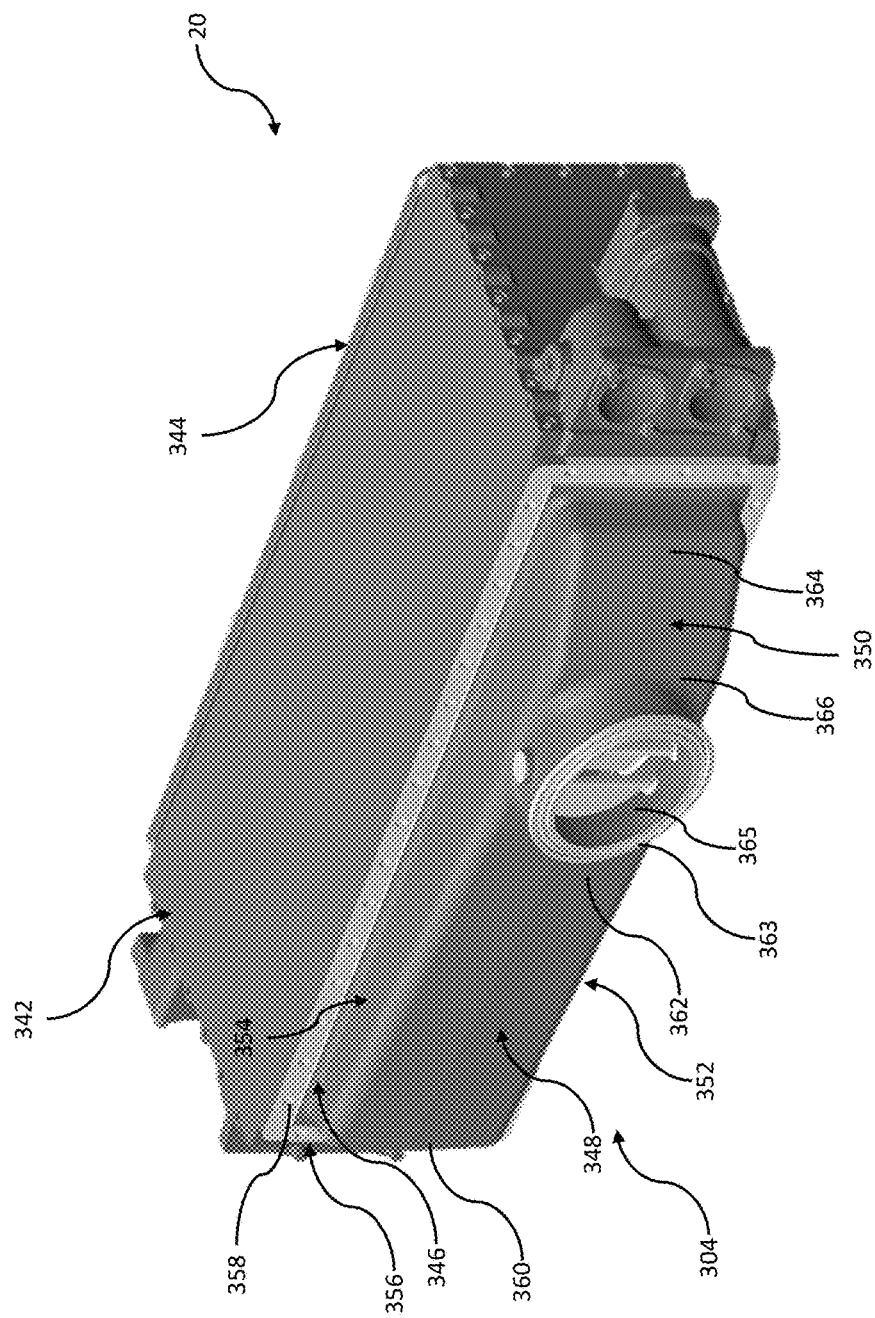
FIG. 13 is a perspective view of an aftercooler of the system of FIG. 1.

Referring now to FIG. 13, aftercooler 20 is shown with inlet diffuser 304. As shown, in addition to inlet diffuser 304, aftercooler 20 includes a housing 342 and an outlet diverter 344. Housing 342 is substantially wider than it is tall. Outlet diverter 344 includes a pair of outlet ports (not shown) which are coupled to throttles 38, 40 (FIG. 4).

Figure 14:
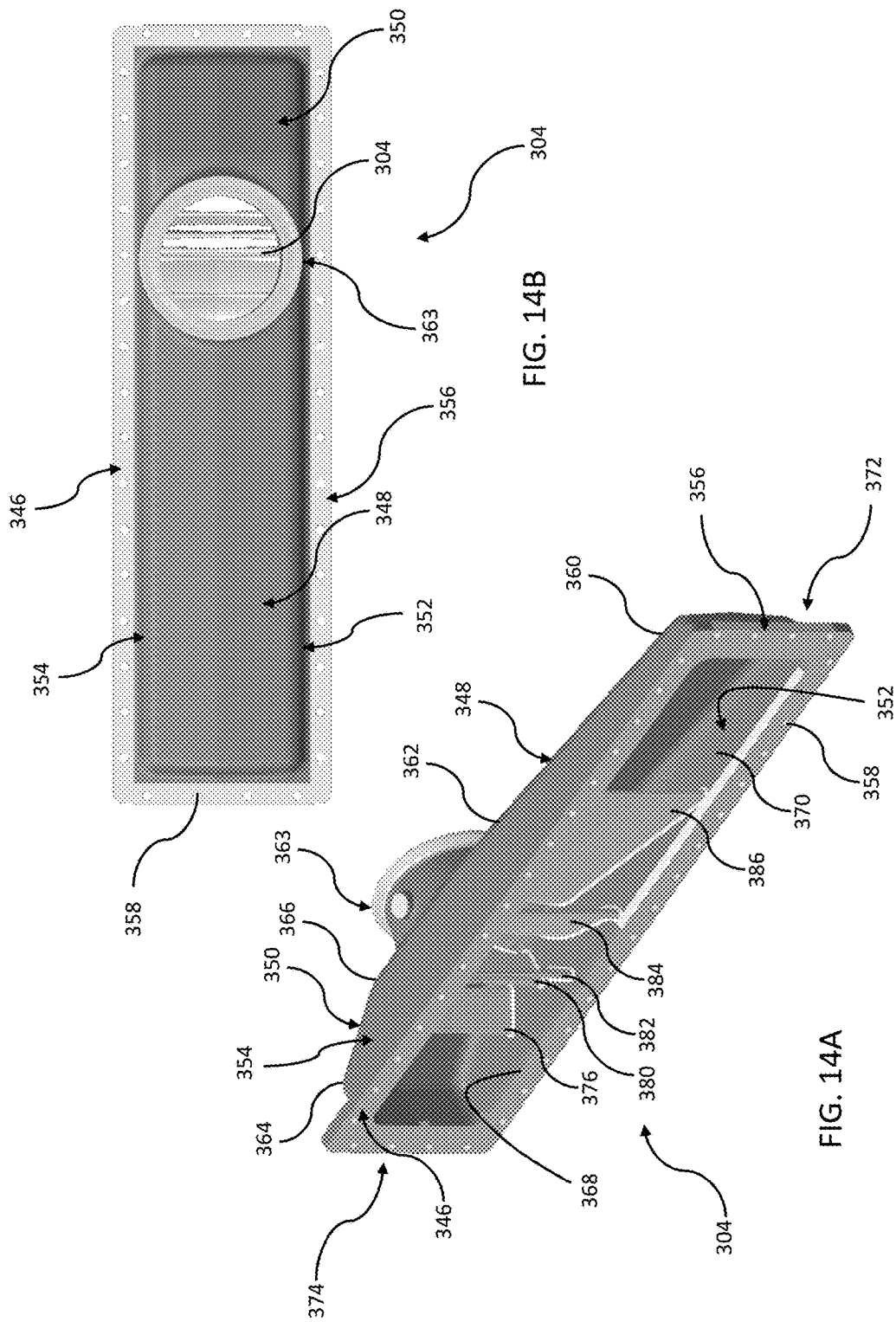
FIG. 14A is a perspective view of an inlet diffuser of the aftercooler of FIG. 13.
FIG. 14B is an end view of the inlet diffuser of FIG. 14A.
Figure 15:
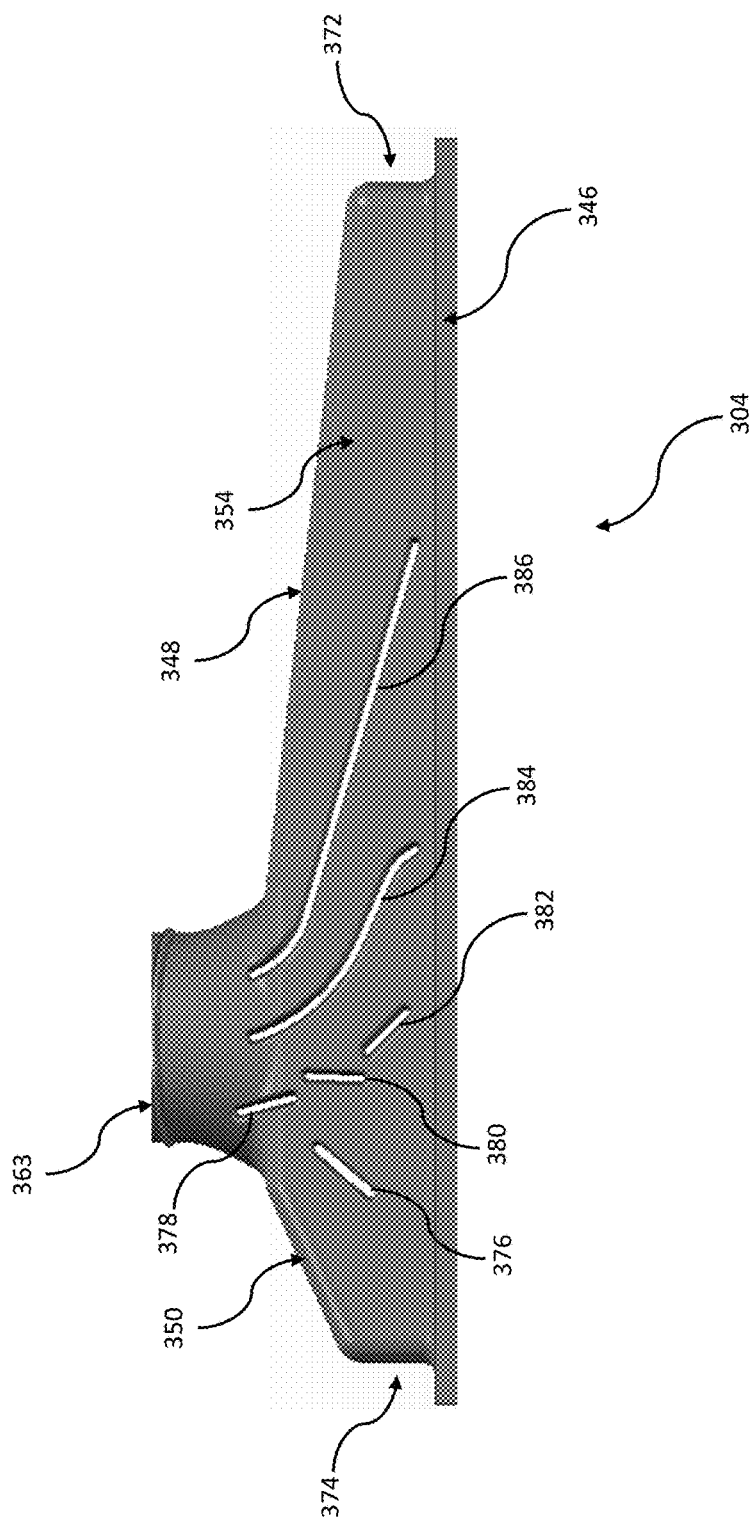
FIG. 15 is a top plan view of the inlet diffuser of FIG. 14A.

Referring now to FIGS. 13-15, inlet diffuser 304 generally includes a forward wall 346, a pair of side walls 348, 350, a lower wall 352 and an upper wall 354. Forward wall 346 includes a peripheral rim 356 with a plurality of through holes 358 for receiving fasteners (not shown) to secure diffuser 304 to housing 342 of aftercooler 20. Side wall 348, which is connected to lower wall 352 and upper wall 354, extends from an end 360 adjacent rim 356 to an end 362 adjacent inlet port 363. Inlet port 363 is configured to be coupled to the outlet of compressor 36 of high pressure turbocharger 18 and includes a central opening 365. Side wall 350 is connected between lower wall 352 and upper wall 354 and extends from an end 364 adjacent rim 356 to an end 366 adjacent inlet port 363. Lower wall 352 extends from forward wall 346 to side walls 348, 350. Similarly, upper wall 354 extends from forward wall 346 to side walls 348, 350. As best shown in FIG. 14A, forward wall 346 forms an opening 368 which delivers air to housing 342, and side walls 348, 350, lower wall 352 and upper wall 354 define an interior volume 370 of diffuser 304 across which air is distributed for delivery to housing 342.

In this embodiment of the disclosure, six fins are disposed within interior volume 370, each extending between lower wall 352 and upper wall 354. As shown in the figures, inlet port 363 is not centrally disposed on inlet diffuser 304 (i.e., is offset from a central region of diffuser 304). This is to accommodate the location of the outlet of compressor 36 of high pressure turbocharger 18. Because inlet port 363 is offset, the shape of diffuser 304 and the location and shape of the inner fins are designed to distribute incoming air evenly across opening 368 for even penetration into cooler housing 306. Upper wall 354 and lower wall 352 taper in width from inlet port 363 to end 372 of diffuser 304 and from inlet port 363 to end 374 of diffuser 304. As best shown in FIG. 15, a first fin 376 is substantially straight and slants toward end 374 with distance from inlet port 363 toward forward wall 346. A second fin 378 is substantially straight, disposed partially within port 364, and slants toward end 372 with distance from inlet port 363 toward forward wall 346. A third fin 380 is substantially straight and slants very slightly toward end 374 with distance from inlet port 363 toward forward wall 346. A fourth fin 382 is substantially straight and slants toward end 372 with distance from inlet port 363 toward forward wall 346. A fifth fin 384 is curved in an elongated S-shape and generally slants toward end 372 with distance from inlet port 363 toward forward wall 346. Fin 384 extends from within inlet port 363 to a location adjacent forward wall 346. Finally, a sixth fin 386 is partially curved adjacent inlet port 363 and extends at a slant toward end 372 with distance from inlet port 363 toward forward wall 346. Fin 386 also extends from within inlet port 363 to a location adjacent forward wall 346.

Figure 16:
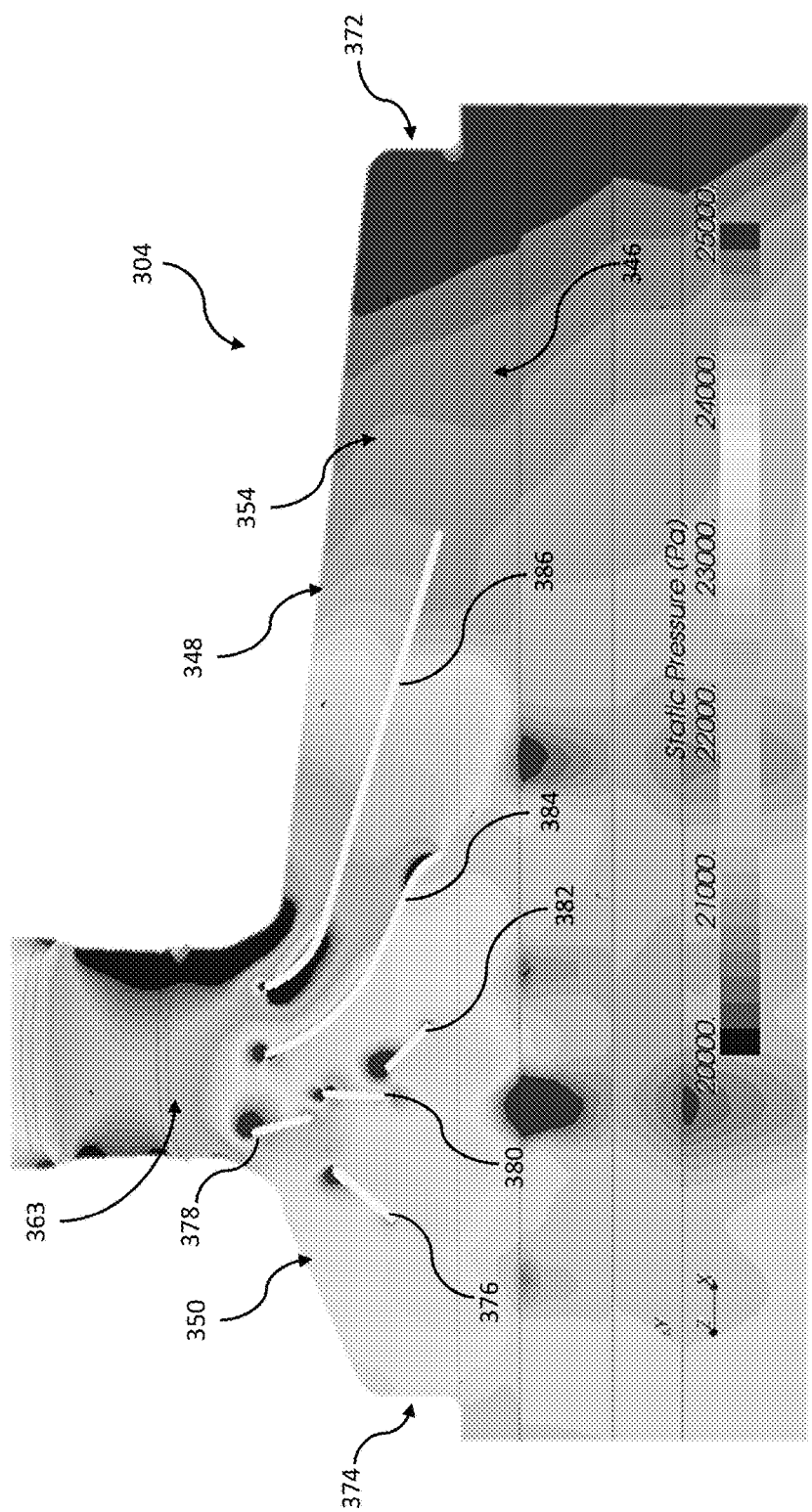
FIG. 16 depicts a simulation of static pressure within the inlet diffuser of FIG. 14A.

Referring now to FIG. 16, a simulation of static pressure at various locations within inlet diffuser 304 is shown. As shown, fins 376, 378, 380, 382, 384, 386 divert air across diffuser 304 such that the pressure of the air at various locations adjacent forward wall 346 is approximately equal. While the disclosed embodiment includes six fins having the shapes and positions shown, it should be understood that more or fewer than six fins may be employed having shapes and locations that are different from those shown.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. As well, while the novel technology was illustrated using specific examples, theoretical arguments, accounts, and illustrations, these illustrations and the accompanying discussion should by no means be interpreted as limiting the technology. All patents, patent applications, and references to texts, scientific treatises, publications, and the like referenced in this application are incorporated herein by reference in their entirety.

We claim:
1. A system, comprising:
an engine having a first cylinder bank and a second cylinder bank disposed in a VEE configuration, each of the first and second cylinder banks having a centerline that lies in a plane that passes through a crankshaft centerline, the planes defining a VEE above the crankshaft centerline;
a first compressor configured to compress a fluid to a first pressure;
a first cooler coupled to the first compressor, the first cooler receiving the compressed fluid from the first compressor and cooling the compressed fluid;
a second compressor coupled to the first cooler, the second compressor being configured to receive cooled, compressed fluid from the first cooler and compress the cooled, compressed fluid to a second pressure that is higher than the first pressure; and
a second cooler coupled to the second compressor, the second cooler receiving the compressed fluid from the second compressor and cooling the compressed fluid for introduction into the pair of cylinder banks; and
a first and second throttle;
wherein the first compressor, the first cooler, the second compressor and the second cooler are disposed within the VEE; and
wherein the first throttle is upstream of the first cylinder bank and in fluid communication with the first cylinder bank via a first flow path, and the second throttle is upstream of the second cylinder bank and in fluid communication with the second cylinder bank via a second flow path.

2. The system of claim 1, wherein the first compressor is part of a low pressure turbocharger and the second compressor is part of a high pressure turbocharger.

3. The system of claim 2, wherein the low pressure turbocharger is at least partially disposed beyond one end of the engine.

4. The system of claim 1, wherein the first flow path and the second flow path are formed within a thermal housing coupled to the first and second throttle, the first flow path being separate from the second flow path.

5. The system of claim 1, wherein the first and second throttles are coupled to the second cooler.

6. The system of claim 1, wherein the first throttle and the second throttle are independently controlled to provide a desired amount of fluid to the first cylinder bank and the second cylinder bank.

7. A two-stage turbo system for a spark-ignited engine having a first cylinder bank and a second cylinder bank disposed in a VEE configuration, a first plane passing through the first cylinder bank and a crankshaft centerline and a second plane passing through the second cylinder bank and the crankshaft centerline defining a VEE above the crankshaft centerline, the system comprising:
a low pressure turbocharger comprising a first compressor configured to compress a fluid to a first pressure;
a high pressure turbocharger comprising a second compressor coupled to the first compressor and configured to compress the fluid to a second pressure that is higher than the first pressure;
a first cooler coupled to the second compressor, the first cooler receiving the compressed fluid from the second compressor and cooling the compressed fluid for introduction into the first and second cylinder banks; and
a first and second throttle configured to receive cooled fluid from the first cooler;
wherein the low pressure turbocharger and the high pressure turbocharger are disposed within the VEE; and
wherein the first throttle is upstream of the first cylinder bank and in fluid communication with the first cylinder bank via a first flow path, and the second throttle is upstream of the second cylinder bank and in fluid communication with the second cylinder bank via a second flow path.

8. The system of claim 7, further comprising a second cooler coupled between the first compressor and the second compressor, the second cooler receiving the compressed fluid from the first compressor and cooling the compressed air.

9. The system of claim 7, wherein the low pressure turbocharger is at least partially disposed beyond one end of the engine.

10. The system of claim 7, wherein the first throttle and the second throttle are independently controlled to provide a desired amount of fluid to the first cylinder bank and the second cylinder bank.

11. A vehicle, comprising:
an engine comprising a first end, a second end, a crankshaft, a first cylinder bank and a second cylinder bank, wherein a first plane passing through the first cylinder bank and a centerline of a crankshaft and a second plane passing through the second cylinder bank and the centerline of the crankshaft define a VEE above the centerline of the crankshaft;
a first turbocharger configured to receive intake fluid and compress the intake fluid to a first pressure, the first turbocharger being disposed within the VEE adjacent the first end of the engine and beyond the first and second cylinder banks along the centerline of the crankshaft; and
a second turbocharger coupled to the first turbocharger and configured to further compress the fluid from the first turbocharger to a second pressure that is higher than the first pressure, the second turbocharger being disposed within the VEE between a first cylinder and a last cylinder of the first cylinder bank.

12. The vehicle of claim 11, further comprising an exhaust manifold having a collector disposed within the VEE adjacent the second turbocharger, the collector being configured to deliver exhaust gas from the first and second cylinder banks to a turbine of the second turbocharger.

13. The vehicle of claim 11, further comprising a first cooler coupled between the first turbocharger and the second turbocharger, the first cooler receiving the compressed intake fluid from the first turbocharger and cooling the compressed fluid.

14. The vehicle of claim 13, wherein the first cooler comprises an inlet diffuser configured to distribute fluid across an inlet of the first cooler.

15. The vehicle of claim 11, further comprising a second cooler coupled to the second turbocharger, the second cooler receiving the compressed fluid from the second turbocharger and cooling the compressed fluid for introduction into the first and second cylinder banks.

16. The vehicle of claim 15, wherein the second cooler comprises an inlet diffuser having a plurality of fins that distribute fluid across an inlet of the second cooler.

17. The system of claim 11, wherein the first turbocharger is at least partially disposed beyond the first end of the engine.

18. A two-stage turbo system for a spark-ignited engine having a first cylinder bank and a second cylinder bank disposed in a VEE configuration, a first plane passing through the first cylinder bank and a crankshaft centerline and a second plane passing through the second cylinder bank and the crankshaft centerline defining a VEE above the crankshaft centerline, the system comprising:
a low pressure turbocharger comprising a first compressor configured to compress a fluid to a first pressure;
a high pressure turbocharger comprising a second compressor coupled to the first compressor and configured to compress the fluid to a second pressure that is higher than the first pressure;
a first throttle upstream of the first cylinder bank and in fluid communication with the first cylinder bank via a first flow path, the first throttle being downstream of the high pressure turbocharger; and
a second throttle upstream of the second cylinder bank and in fluid communication with the second cylinder bank via a second flow path, the second throttle being downstream of the high pressure turbocharger;
wherein the low pressure turbocharger and the high pressure turbocharger are disposed within the VEE.

* * * * *